United States Patent [19]
Yamazaki et al.

[11] Patent Number: 5,699,116
[45] Date of Patent: Dec. 16, 1997

[54] CAMERA APPARATUS

[75] Inventors: Tatsuya Yamazaki, Machida; Hiroto Okawara, Toride, both of Japan

[73] Assignee: Canon Kabushiki Kaisha, Tokyo, Japan

[21] Appl. No.: 781,526

[22] Filed: Jan. 9, 1997

Related U.S. Application Data

[63] Continuation of Ser. No. 496,898, Jun. 29, 1995, abandoned, which is a continuation of Ser. No. 101,846, Aug. 4, 1993, abandoned.

[30] Foreign Application Priority Data

Aug. 7, 1992 [JP] Japan .................. 4-232823

[51] Int. Cl.$^6$ .................. H04N 5/232
[52] U.S. Cl. .................. 348/354; 348/347; 348/349
[58] Field of Search .................. 348/345, 347, 348/349, 351, 352, 354, 356; 396/121, 123, 124

[56] References Cited

U.S. PATENT DOCUMENTS 5,003,339  3/1991  Kikuchi et al. .................. 354/402

*Primary Examiner*—Andrew Faile
*Assistant Examiner*—Andrew B. Christensen
*Attorney, Agent, or Firm*—Robin, Blecker, Daley and Driscoll

[57] ABSTRACT

A camera, which includes a first lens group for a zoom operation, a second lens group for a focus adjustment operation, a motor for moving the first and second lens groups parallel to an optical axis, a sharpness signal detection circuit for extracting a sharpness signal according to a focusing degree from a video signal of an object image formed via the first and second lens groups, and a focus adjustment circuit for performing the focus adjustment operation on the basis of the sharpness signal output from the sharpness signal detection circuit, further includes a sharpness signal detection region changing circuit for changing a region for extracting the sharpness signal at a predetermined period within a picture obtained from the video signal.

20 Claims, 5 Drawing Sheets

CAMERA APPARATUS

This is a continuation Ser. No. 08/496,898 filed Jun. 29, 1995, abandoned, which is a continuation of Ser. No. 08/101,846 filed Aug. 4, 1993 (abandoned.)

BACKGROUND OF THE INVENTION

1. Field of the Invention

The present invention relates to a camera for automatically adjusting a focal point by utilizing a video signal.

2. Related Background Art

In an apparatus having a two-dimensional image pickup element such as a video camera, a system for adjusting the focusing state by detecting the sharpness of a picture from a video signal of an object image, and controlling the focusing lens position to maximize the sharpness is known.

The sharpness is normally evaluated using the intensity of a high-frequency component of a video signal extracted by a band-pass filter or the defocus width detection intensity of a video signal extracted by, e.g., a differential circuit. When a normal object is photographed, these signals are small in an out-of-focus state, increase as the focusing state approaches an in-focus state, and reach maximum values in a just in-focus state. Therefore, when the sharpness is small, the focusing lens is controlled to move as quickly as possible in a direction to increase the sharpness, and as the sharpness is increased, the focusing lens is moved more slowly. The focusing lens is then stopped just at the top of the mountain with high precision, i.e., an in-focus state is attained. In general, such an auto-focus system is called a mountain-climbing auto-focus (to be abbreviated as "mountain-climbing AF" hereinafter) system.

In a conventional camera, a region (to be referred to as a "distance measurement frame" hereinafter) for extracting a sharpness signal necessary for the mountain-climbing AF is set at substantially the central portion of a picture (see A in FIG. 3). This setting is based on an assumption that a photographer brings an object to be photographed to the central portion of the picture.

However, in the conventional camera, since the distance measurement frame is fixed at the center of the picture, when an object to be photographed is moving from a position inside the distance measurement frame to a position outside the distance measurement frame, although the current focus position is the in-focus position, it is determined that an object is not present, and the focusing lens is moved in a defocus direction, and is consequently focused on another object present in the distance measurement frame.

SUMMARY OF THE INVENTION

The present invention has been made to solve the conventional problem, and has as its object to provide a camera, which can prevent a focus shift upon movement of an object within a picture, and can improve stability of an auto-focus function.

In order to achieve the above object, according to a preferred aspect of the present invention, there is disclosed a camera which has a first lens group for a zoom operation, a second lens group for a focus adjustment operation, driving means for moving the first and second lens groups parallel to an optical axis, sharpness signal detection means for detecting a sharpness signal in accordance with a focusing degree from a video signal of an object image formed via the first and second lens groups, and focus adjustment means for performing the focus adjustment operation on the basis of the detected sharpness signal, comprising sharpness signal detection region changing means for changing a region for detecting the sharpness signal at a predetermined period within a picture obtained from the video signal.

According to another preferred aspect of the present invention, there is disclosed a camera comprising inhibition means for inhibiting the change of the sharpness signal detection region in a case excluding one in which the focus adjustment means determines an in-focus state or during the driving operation of the first lens group.

According to still another preferred aspect of the present invention, there is disclosed a camera, which can select a region fixed when the change of the sharpness signal detection region is inhibited, in accordance with the sharpness signal obtained in the region changed at the predetermined period.

According to still another preferred aspect of the present invention, there is disclosed a camera further comprising region selection means for selecting a region fixed when the change of the sharpness signal detection region is inhibited, in accordance with a photographing state.

Thus, the region for detecting the sharpness signal, i.e., the distance measurement frame is changed at the predetermined period.

In a case excluding one in which the in-focus state is determined, or during the driving operation of the first lens group for a zoom operation, the change of the distance measurement frame is inhibited.

When the change of the distance measurement frame is inhibited, the distance measurement frame is selected in accordance with the sharpness signal obtained within the distance measurement frame changed at the predetermined period or in accordance with a photographing state.

DETAILED DESCRIPTION OF THE PREFERRED EMBODIMENTS

Figure 1:
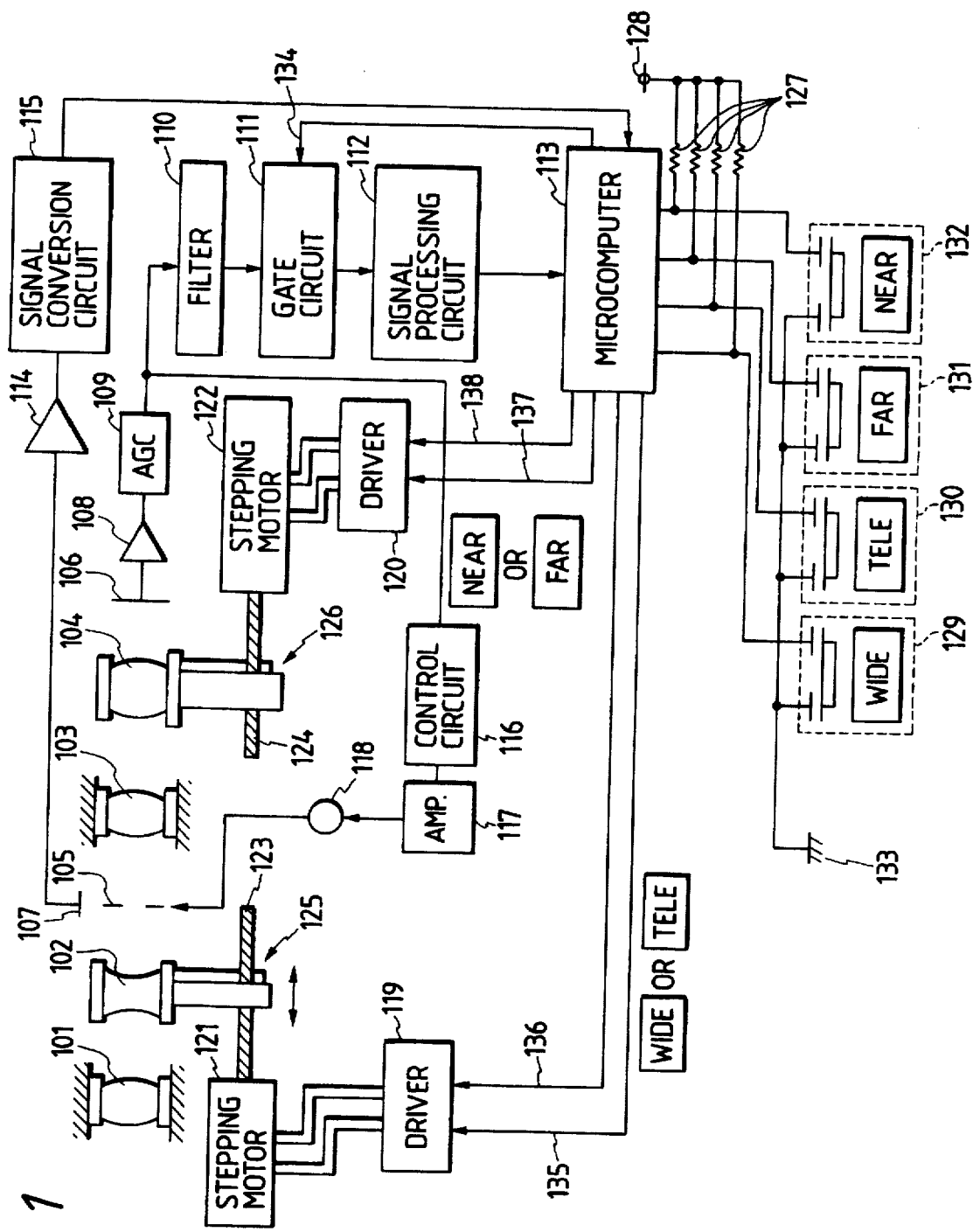
FIG. 1 is a diagram showing an arrangement of main part of a camera according to an embodiment of the present invention.

. FIG. 1 is a diagram showing an arrangement of main part of a camera according to an embodiment of the present invention.

Referring to FIG. 1, an inner-focus type lens system is constituted by a stationary front-element lens group 101, a second lens group 102 for a zoom operation, a diaphragm 105, a stationary third lens group 103, and a fourth lens group 104 having both a compensation function and a focusing function. The camera also includes an image pickup element 106 such as a CCD, an encoder 107 for detecting the state of the aperture, an amplifier 108 having an impedance converter, a known AGC (automatic gain controller) 109, a band-pass filter 110 for extracting only a high-frequency component, which changes according to the focusing state, of a video signal, a gate circuit 111 for forming a distance measurement frame for performing AF (auto-focus) processing, i.e., processing for determining a region for extracting the high-frequency component in the picture, a signal processing circuit 112 for processing a video signal (generating a sharpness signal) for the AF processing, a microcomputer 113 for systematically performing control of the entire system such as drive control of the lenses, AF control, and the like, an amplifier 114 for amplifying an output signal, i.e., an aperture signal, from the encoder 107, a signal conversion circuit 115 for converting an output signal from the amplifier 114 into a signal, which can be read by the microcomputer 113, a control circuit 116 for adjusting the opening/closing state of the diaphragm 105, so that the output level of the AGC 109 is maintained at a predetermined level, an amplifier 117 for amplifying the output from the control circuit 116, and a driver 118 for driving the diaphragm 105.

The camera also includes drivers 119 and 120 for outputting driving energy to stepping motors 121 and 122 in accordance with driving commands of the second lens group 102 and the fourth lens group 104 output from the microcomputer 113. The stepping motors 121 and 122 respectively have output shafts 123 and 124. The output shafts 123 and 124 are respectively engaged with racks 125 and 126. Upon rotation of the output shafts 123 and 124, the racks 125 and 126 are moved parallel to the optical axis of the lens groups 102 and 104, and the lens groups 102 and 104 fixed to the racks 125 and 126 are moved.

The camera further includes a pull-up register group 127, a power source 128, ground 133, zoom switches 129 and 130 for respectively moving the second lens group 102 in a wide direction and a tele direction, and power focus switches 131 and 132 for respectively moving the fourth lens group 104 in a far direction and a near direction.

Figure 2:
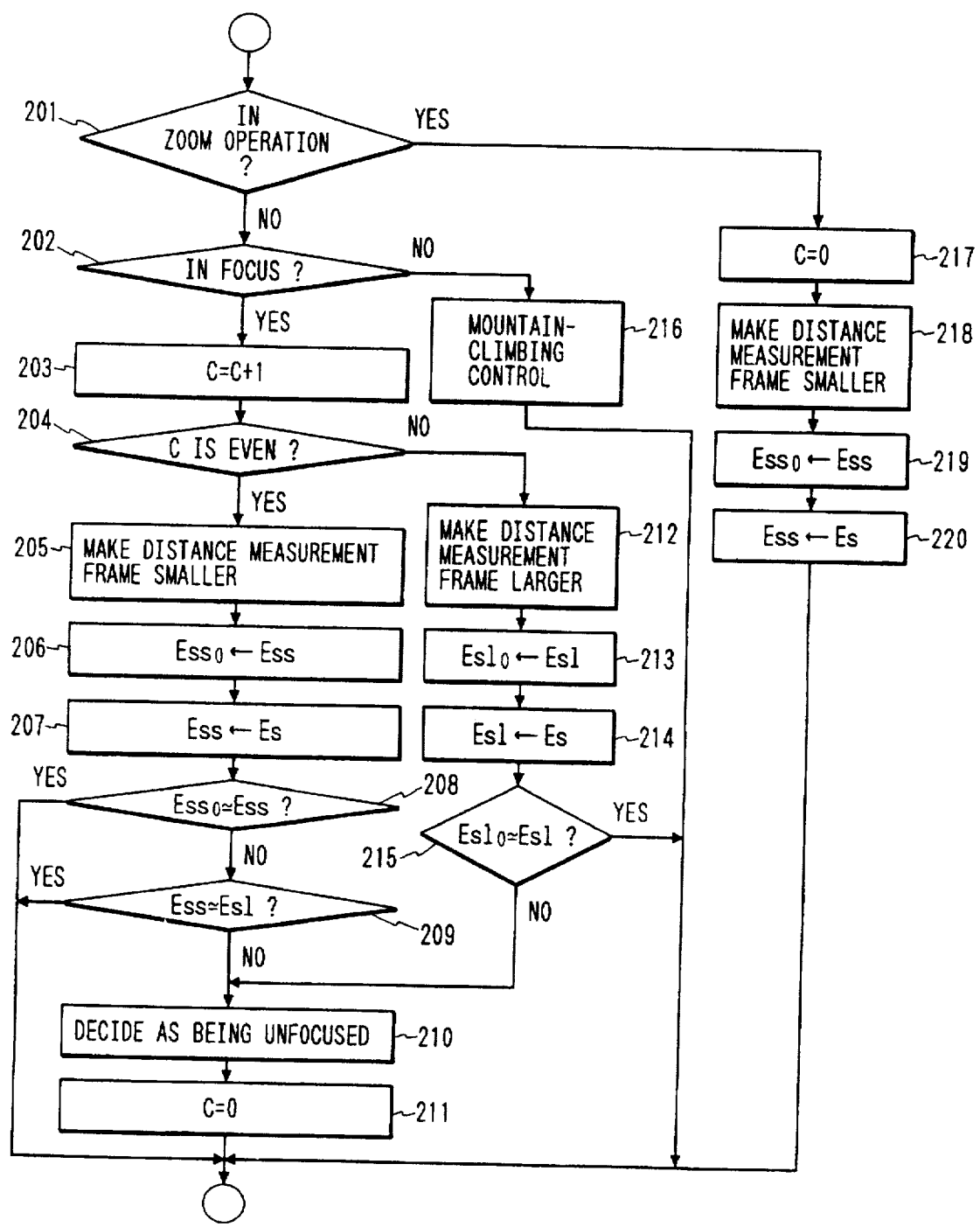
FIG. 2 is a flow chart of a program of auto-focus control.

FIG. 2 is a flow chart of an auto-focus control portion of the control operations of the entire camera executed by the microcomputer 113 in the arrangement shown in FIG. 1. The processing shown in this flow chart is executed at a predetermined time interval (e.g., a vertical synchronization period).

Referring to FIG. 2, it is checked in step 201 if a zoom operation is being performed. If the zoom operation is not performed (NO in step 201), it is checked if an in-focus state is attained (202). If an in-focus state is attained (YES in step 202), a count value C of an internal counter for setting the distance measurement frame of the microcomputer 113 is incremented (step 203), and it is checked if the count value C is an even number (step 204).

Figure 3:
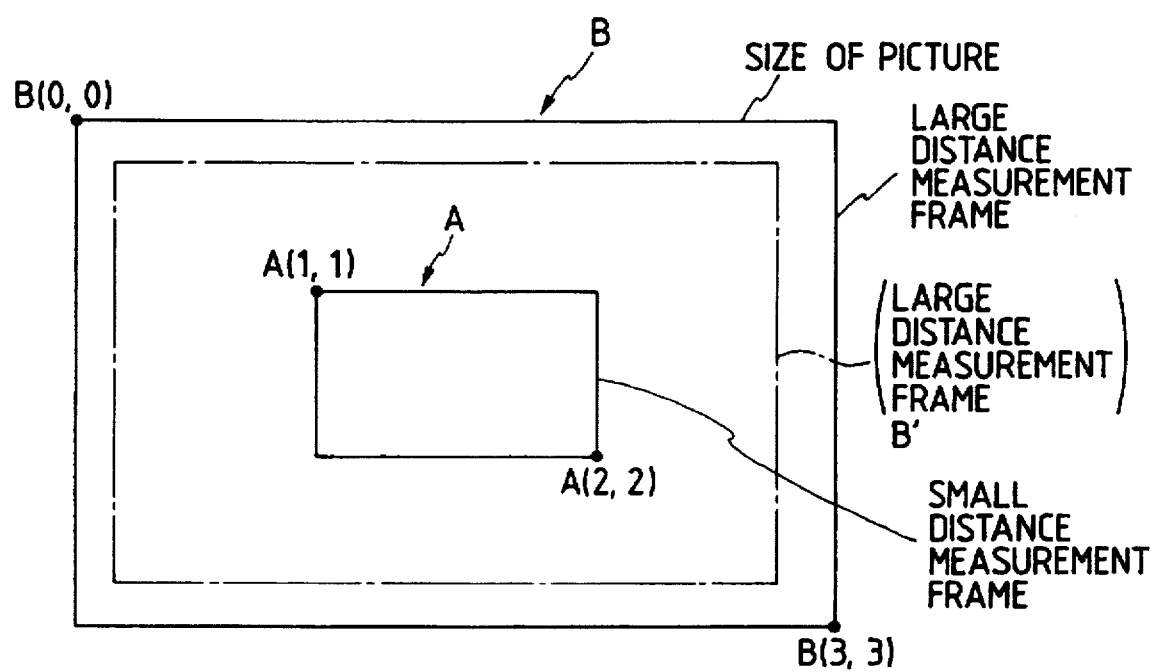
FIG. 3 is a view showing an example of a distance measurement frame.

If the count value C is an even value (YES in step 204), the distance measurement frame is made smaller (for example, a distance measurement frame A shown in FIG. 3 is selected) (step 205), a sharpness signal (small distance measurement frame signal) Ess previously fetched using the small distance measurement frame is set as a previous value $Ess_0$ of a signal obtained using the small distance measurement frame (step 206), and a sharpness signal Es currently detected from the distance measurement frame is set as a current value Ess of a signal obtained using the small distance measurement frame (step 207). The flow then advances to step 208. The distance measurement frame is changed by supplying a control signal from the microcomputer 113 to the gate circuit 111 via a signal line 134 (FIG. 1).

On the other hand, if NO in step 204, i.e., if the count value C is an odd number, the distance measurement frame is made larger (for example, a distance measurement frame B shown in FIG. 3 is selected) (step 212), a sharpness signal (large distance measurement frame signal) Esl previously fetched using the large distance measurement frame is set as a previous value $Esl_0$ of a signal obtained using the large distance measurement frame (step 213), and a sharpness signal Es currently detected, from the distance measurement frame is set as a current value Esl of a signal obtained using the large distance measurement frame (step 214). The flow then advances to step 215.

It is checked in step 208 if the previous value $Ess_0$ and the current value Ess of the small distance measurement frame signal are almost equal to each other. If YES in step 208, i.e., if $Ess_0 \cong Ess$, it is determined that an in-focus state is attained, and this processing ends.

If NO in step 208, i.e., if the current value Ess largely changes from the previous value $Ess_0$, it is checked if the current value Ess of the small distance measurement frame signal is almost equal to the current value Esl of the large distance measurement frame signal (step 209). If YES in step 209, i.e., if $Ess \cong Esl$, this means that an object is not detected by the small distance measurement frame, but is detected by the large distance measurement frame. Thus, it is determined that an object is outside the small distance measurement frame since the object moved or the camera was panned, and this processing ends.

If NO in step 209, i.e., if the current value Ess of the small distance measurement frame signal is largely different from the current value Esl of the large distance measurement frame signal, it is determined that the object distance is largely changed, and an unfocused state is decided (step 210). Also, the count value C is cleared (step 211), and this processing ends. In this case, when this processing is executed for the next time, if a zoom operation is not being performed, NO is determined in step 202, and mountain-climbing control is performed using the small distance measurement frame set in step 205 (step 216).

On the other hand, it is checked in step 215 if the previous value $Esl_0$ and the current value Esl of the large distance measurement frame signal are almost equal to each other. If YES in step 215, i.e., $Esl_0 \cong Esl$, an in-focus state is decided, and this processing ends.

If NO in step 215, i.e., if the current value Esl largely changes from the previous value $Esl_0$, the flow advances to step 210. Therefore, in this case, when this processing is executed for the next time, if a zoom operation is not being performed, mountain-climbing control in step 216 is performed.

When the distance measurement frame is large, since the large distance measurement frame includes a small one, the current value Ess of the small distance measurement frame signal need not be compared with the current value Esl of the large distance measurement frame signal. In this case, if the entire small distance measurement frame is not included in the large distance measurement frame, the decision step 209 is necessary.

If YES in step 201, i.e., if a zoom operation is being performed, the count value C is cleared (step 217), and the same processing as in steps 205 to 207 is performed (steps 218 to 220), thus ending this processing. The distance measurement frame is made smaller during a zoom operation for the following reason. That is, if the large distance measurement frame is selected, a change in sharpness signal becomes large due to a change in field angle, and information obtained by the large distance measurement frame becomes less significant.

FIG. 3 is a view showing an example of the distance measurement frame. The distance measurement frame A is a small frame, and the frame B is a large frame, x and y in A(x, y) and B(x, y) respectively represents the horizontal and vertical positions, and the size of the distance measurement frame can be changed within the picture by changing these points. In this embodiment, the size of the large distance measurement frame is equal to the size of the picture. However, as indicated by an alternate long and short dashed line B' in FIG. 3, the size of the large distance measurement frame can be appropriately set depending on each case.

As described above, according to this embodiment, even when the current value Ess of the small distance measurement frame signal largely changes from the previous value $Ess_0$, if it is almost equal to the current value Esl of the large distance measurement frame signal, an in-focus state is decided. Therefore, an erroneous decision of an unfocused state can be avoided when an object moves outside the small distance measurement frame when the object moves or the camera is panned. When the object distance changes, since the difference between the values Ess and Esl becomes large (NO is determined in step 209), an unfocused state can be precisely detected. Therefore, whether an object moves while keeping the same object distance or the object distance changes can be recognized, and stability of auto-focus control can be improved.

Note that, in step 204 in FIG. 2, the distance measurement frame is changed once in two operations. However, the present invention is not limited to this. For example, the distance measurement frame may be changed once in three or more operations.

Figure 4:
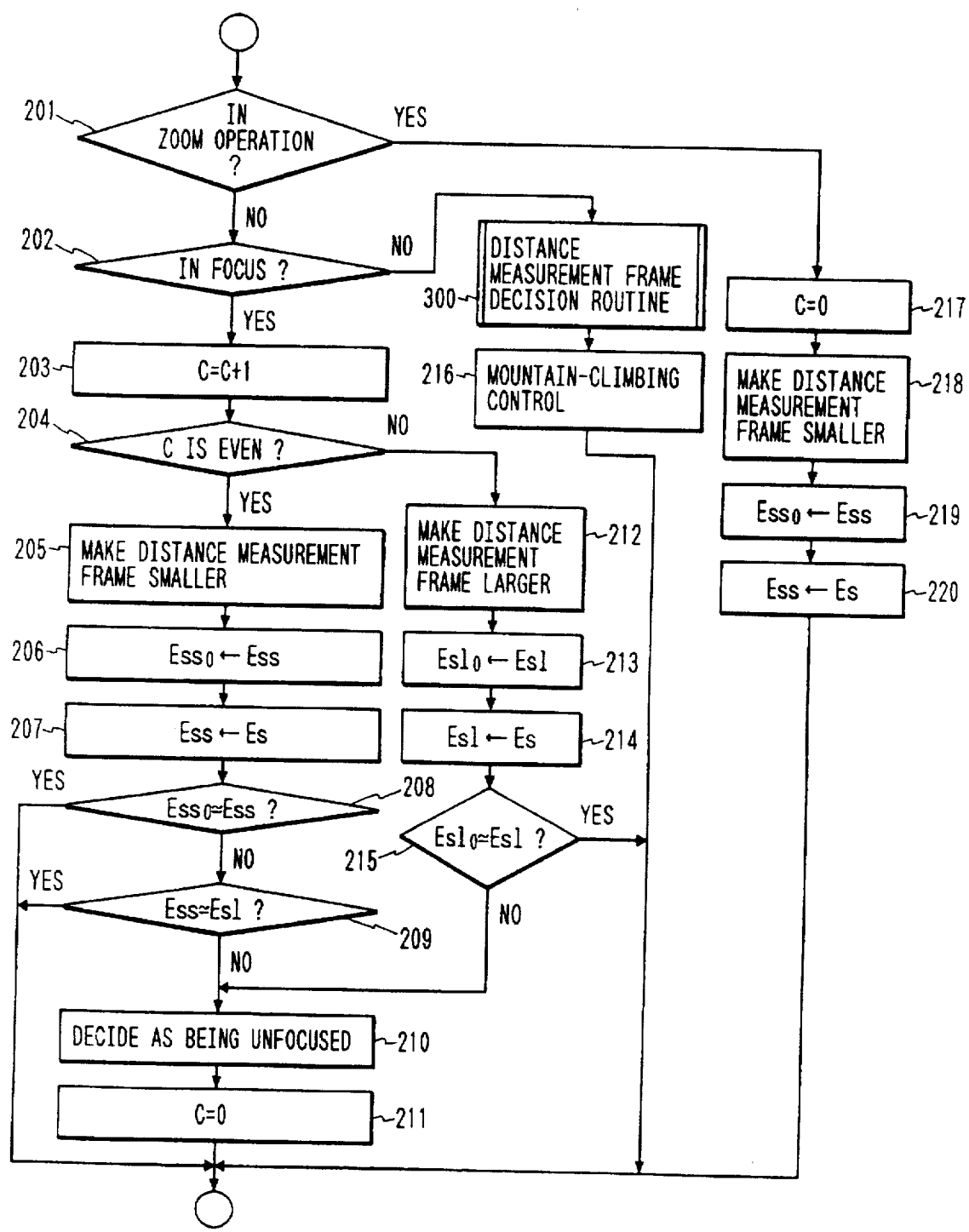
FIG. 4 is a flow chart of a program of auto-focus control according to another embodiment of the present invention.

FIG. 4 is a flow chart showing auto-focus control according to another embodiment of the present invention. In this flow chart, step 300 is inserted between steps 202 and 216 in the flow chart shown in FIG. 2, and other steps are the same as those in the flow chart shown in FIG. 2.

Figure 5:
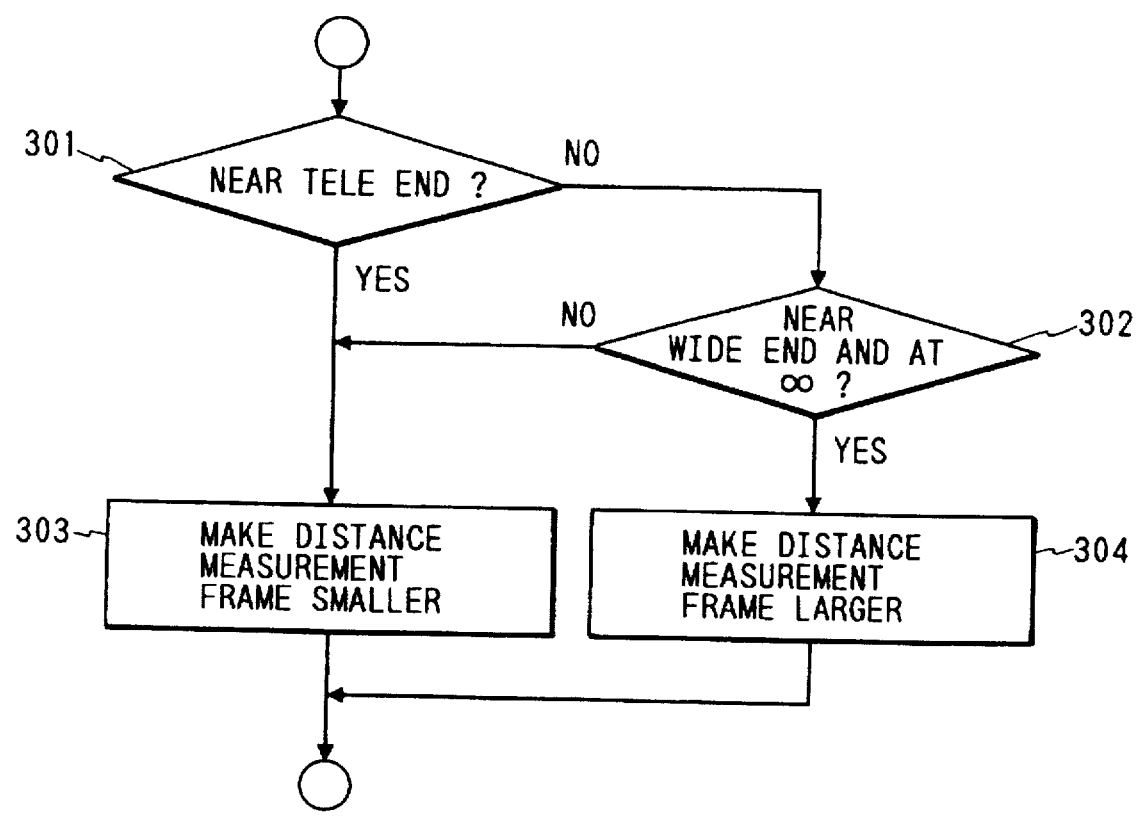
FIG. 5 is a flow chart of a subroutine executed in the program shown in FIG. 4.

Referring to FIG. 4, in step 300, a distance measurement frame decision routine shown in FIG. 5 is executed.

Referring to FIG. 5, it is checked in step 301 if the second lens group of the zoom mechanism is present near the tele end. If YES in step 301, the distance measurement frame is made smaller, and this routine ends.

If NO in step 301, i.e., if the second lens group 102 is not located near the tele end, it is checked if the second lens group 102 is located near the wide end, and the fourth lens group 104 is located at a position of a focal length ∞ (step 302). If YES in step 302, the distance measurement frame is made larger (step 304); if NO in step 302, the distance measurement frame is made smaller (step 303), and this routine ends.

More specifically, according to this embodiment, the small distance measurement frame is fixed during a zoom operation. When a zoom operation is not performed, and an unfocused state is decided, if the second lens group is located near the wide end, and the fourth lens group is located at the position of the object distance ∞, the large distance measurement frame is fixed; otherwise, the small frame is fixed. Thus, the distance measurement frame is selected in accordance with the photographing state, and smooth and quick auto-focus control can be realized.

As described above, according to the camera of each of the above embodiments, since a region for detecting a sharpness signal is changed at a predetermined period, whether an object moves while keeping the same object distance or the object distance changes can be recognized, and stability of auto-focus control can be improved.

Since a region for detecting a sharpness signal can be selected in accordance with the photographing state, smooth and quick auto-focus control can be realized.

What is claimed is:

1. A camera comprising:

(A) focus detecting area setting means for setting a focus detecting area on a picture;

(B) controlling means for controlling said focus detecting area setting means to change alternatingly a size of the focus detecting area at a predetermined rate during a period of time in which an in-focus state is maintained; and (C) discriminating means for detecting focus evaluating signals corresponding to focus detecting areas whose sizes are different from each other, for computing the levels of the focus evaluating signals in each detecting area, and for discriminating a focus condition in existence during said period of time.

2. A camera according to claim 1, wherein said controlling means switches two large and small different focus detecting areas at a vertical synchronization period.

3. A camera according to claim 1, further comprising image pickup means, and wherein said focus detecting area setting means includes a gate circuit for extracting only an image pickup signal corresponding to a position inside the focus detecting area from image pickup signals output from said image pickup means.

4. A camera according to claim 3, wherein said discriminating means includes a band-pass filter for extracting a high-frequency component of an image signal corresponding to a position inside the focus detecting area, and generating focusing state information.

5. A camera according to claim 1, wherein said controlling means switches the size of the focus detecting area at a predetermined period, and detects an in-focus state, an unfocused state, and movement of an object on the basis of focusing states detected using large and small focus detecting areas.

6. A camera according to claim 5, wherein said controlling means switches two large and small focus detecting areas at the predetermined period; said controlling means compares previous and current focusing states detected using the small focus detecting area, and decides the in-focus state if the two states are substantially equal to each other; said controlling means compares the focusing state detected using the small focus detecting area with a focusing state detected using the large focus detecting area if the previous and current focusing states detected using the small focus detecting area are not equal to each other, and decides the in-focus state if the two states are substantially equal to each other; and said controlling means decides the unfocused state if the focusing states detected using the small and large focus detecting areas are largely different from each other.

7. A camera according to claim 1, further comprising zooming means for performing a zoom operation.

8. A camera according to claim 7, wherein said controlling means performs different control operations depending on whether or not said zooming means is in operation.

9. A camera according to claim 8, wherein said controlling means fixes the focus detecting area to a small size when said zooming means is in operation.

10. A camera according to claim 7, wherein said controlling means sets a small focus detecting area when said zooming means is located near a tele-end, and sets a large focus detecting area when said zooming means is located near a wide end, and an object distance is ∞.

11. A video camera apparatus comprising:

a first lens group for a zoom operation;

a second lens group for a focus adjustment operation;

driving means for moving said first and second lens groups parallel to an optical axis;

sharpness signal generating means for generating sharpness signals according to a focusing degree from a video signal of an object image formed via said first and second lens groups;

focus adjustment means for performing the focus adjustment operation on the basis of the sharpness signals output from said sharpness signal generating means; and control means for creating a plurality of detection regions by changing alternatingly during an in-focus state a size of a detection region for detecting the sharpness signals, said change occurring at every predetermined number of generating operations by said sharpness signal generating means within a picture obtained from the video signal and discriminating a focus condition in existence during said in-focus state on the basis of the sharpness signals corresponding to the changed detection regions, respectively.

12. An apparatus according to claim 11, further comprising inhibition means for causing said control means to inhibit a change of the sharpness signal detection region during a driving operation of said first lens group.

13. An apparatus according to claim 12, wherein a smaller one of the sharpness signal detection region is used when the change of the sharpness signal detection region is inhibited by said inhibition means.

14. An apparatus according to claim 12, further comprising region selection means for selecting a region fixed when the change of the sharpness signal detection region is inhibited, in accordance with a photographing state.

15. An image processing apparatus comprising:

(A) region setting means capable of setting a plurality of detection regions having different sizes within a picture;

(B) generating means for generating a predetermined signal component from an image within a detection region;

(C) switching means for controlling said region setting means to switch alternatingly during an in-focus state the size of the detection region, said switching taking place at every predetermined number of generating operations by said generating means; and (D) control means for controlling the operation of said switching means on the basis of an operation of the predetermined signal components output by said generating means, respectively.

16. An apparatus according to claim 15, further comprising image pickup means, and wherein said region setting means sets the detection region within an image pickup plane of said image pickup means, and allows only a signal within the detection region to pass therethrough.

17. An apparatus according to claim 16, wherein said generating means extracts the predetermined signal component in an image pickup signal output from said image pickup means.

18. An apparatus according to claim 15, wherein said control means performs different control operations on the basis of information of the predetermined signal components obtained from the detection regions having the different sizes switched by said switching means.

19. An apparatus according to claim 18, wherein said generating means generates focusing state information, and said control means performs focus adjustment on the basis of an output from said generating means.

20. An apparatus according to claim 15, wherein said switching means controls said region setting means to switch the size of the detection region at a vertical synchronization period of a television signal.

* * * * *